(12) United States Patent
Kawasaki (10) Patent No.: US 6,515,482 B2
(45) Date of Patent: Feb. 4, 2003

(54) IONIZATION VACUUM GAUGE (75) Inventor: Yousuke Kawasaki, Tokyo (JP)

(73) Assignee: Anelva Corporation (JP)

( * ) Notice: Subject to any disclaimer, the term of this patent is extended or adjusted under 35 U.S.C. 154(b) by 0 days.

(21) Appl. No.: 09/770,656

(22) Filed: Jan. 29, 2001

(65) Prior Publication Data

US 2001/0011890 A1 Aug. 9, 2001

(30) Foreign Application Priority Data

Feb. 2, 2000 (JP) ........................................ 2000-025165

(51) Int. Cl.[7] ........................ G01L 21/30; G01N 27/62; H01J 21/10
(52) U.S. Cl. ........................ 324/460; 324/459; 313/293
(58) Field of Search ................................ 324/460, 462, 324/463, 464; 73/704, 753; 250/81; 313/293

(56) References Cited

U.S. PATENT DOCUMENTS 4,739,664 A * 4/1988 Hetrick ........................ 73/701
5,422,573 A * 6/1995 Bills et al. .................. 250/374

FOREIGN PATENT DOCUMENTS

JP 61062393 3/1986

* cited by examiner

Primary Examiner—Christine Oda
Assistant Examiner—James C. Kerveros
(74) Attorney, Agent, or Firm—Venable; James R. Burdett (57) ABSTRACT An ionization vacuum gauge which can stably perform measurements of pressure in the intermediate vacuum to high vacuum regions, that is performed by an ionization-type first measurement element, as well as in the measurement region intrinsic to a second measurement element. This ionization vacuum gauge comprises a measurement element vessel, and first and second measurement parts provided within this measurement element vessel. The first measurement part comprises component electrodes including a filament, grid and ion collector, and is of an ionization-type construction for measurement of the pressure of vacuum states. The second measurement part is of a construction having different functions from those of the first measurement part, and is disposed in a space that is near the extension of the grid axis, and is away from the principal space for flying of thermal electrons emitted from the filament. A shield plate is provided between the second measurement part and the component electrodes, to spatially separate the second measurement part and the component electrodes. The second measurement part is fixed to an element fastening plate made from a material with excellent thermal conductivity.

15 Claims, 5 Drawing Sheets

IONIZATION VACUUM GAUGE

BACKGROUND OF THE INVENTION

1. Field of the Invention

This invention concerns an ionization vacuum gauge, and in particular a hybrid ionization vacuum gauge which incorporates another measurement part into an ionization vacuum gauge.

2. Description of Related Art

In various conventional semiconductor manufacturing systems and electronic device manufacturing systems which employ high vacuums, upon system startup, during maintenance, and as conditions for various processes, pressure measurements must be performed over a wide range ranging from atmospheric pressure to high vacuum regions. Diverse vacuum gauges are used selectively in different measurement applications.

In general, a Pirani vacuum gauge or other thermal conduction vacuum gauge, quartz friction vacuum gauge, or rotation-type viscosity vacuum gauge other vacuum gauge based on gas transport phenomena is used in high-pressure regions (low vacuum regions) from approximately 1 Pa to $10^5$ Pa. For pressure measurements during processes, diaphragm-type vacuum gauges are primarily used in response to demands for ease of pressure control and high accuracy. On the other hand, in low-pressure ranges (high vacuum ranges) of 1 Pa or below, ionization vacuum gauges, of which the Bayard-Alpert ionization vacuum gauge (hereafter called "B-A ionization vacuum gauge") is representative, are widely used. In addition, hybrid type vacuum gauges, which combine a vacuum gauge for measurements in high-pressure regions (low vacuum regions) with a vacuum gauge for measurements in low-pressure regions (high vacuum regions), have been developed as vacuum gauges to perform pressure measurements over a broad range extending from atmospheric pressure to high vacuum regions.

As an example of such a hybrid type vacuum gauge, Japanese Patent Application Laid-open No. 62-218834 discloses a vacuum gauge in which a quartz friction vacuum gauge used for measurements in high-pressure regions (low vacuum regions) from approximately 1 Pa to $10^5$ Pa, and a B-A ionization vacuum gauge used for measurements in low-pressure regions (high vacuum regions) of 1 Pa or lower, are installed on the same flange.

Figure 4:
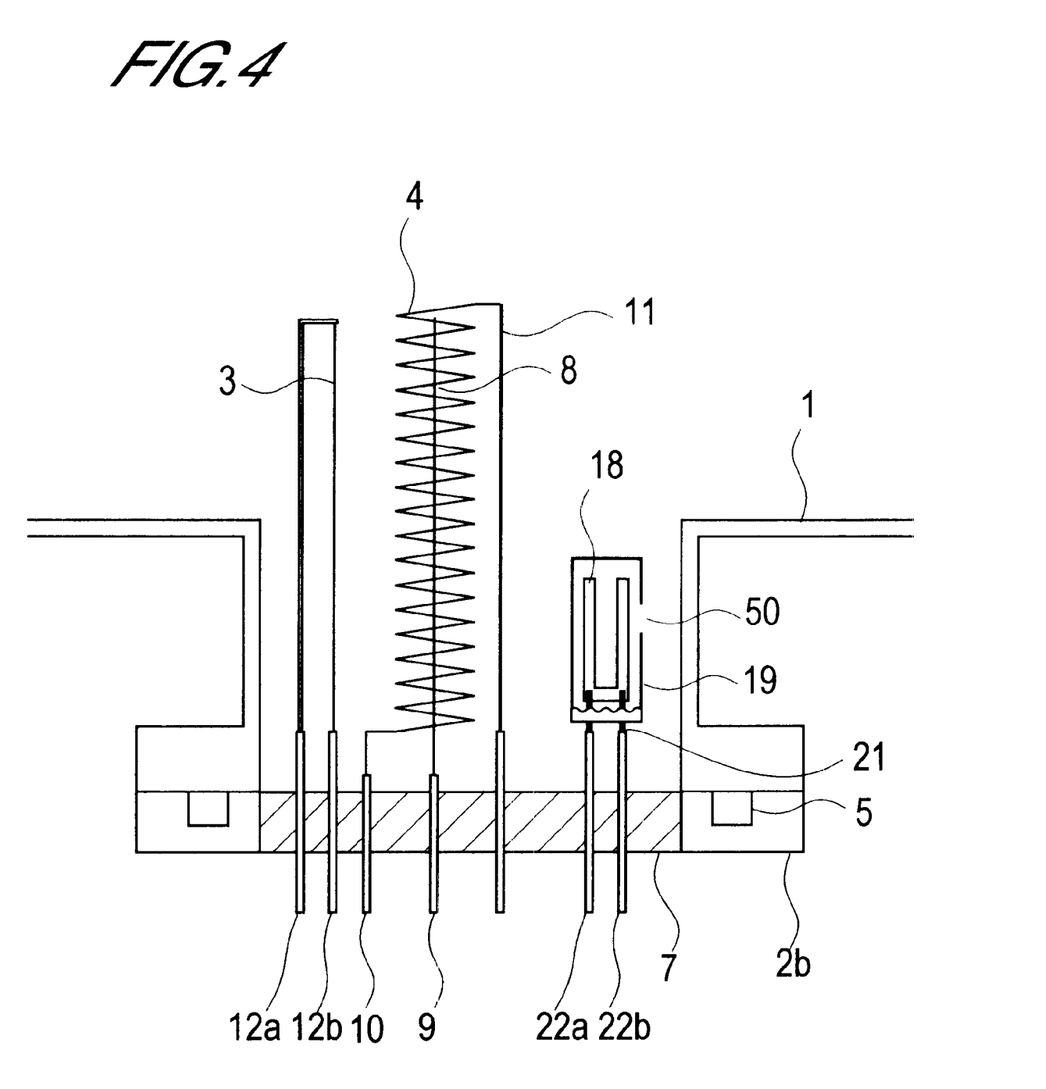
FIG. 4 is a cross-sectional diagram showing the configuration of an ionization vacuum gauge of the prior art; and, FIG. 5 is a block diagram showing the control circuit of an ionization vacuum gauge of the prior art.
Figure 5:
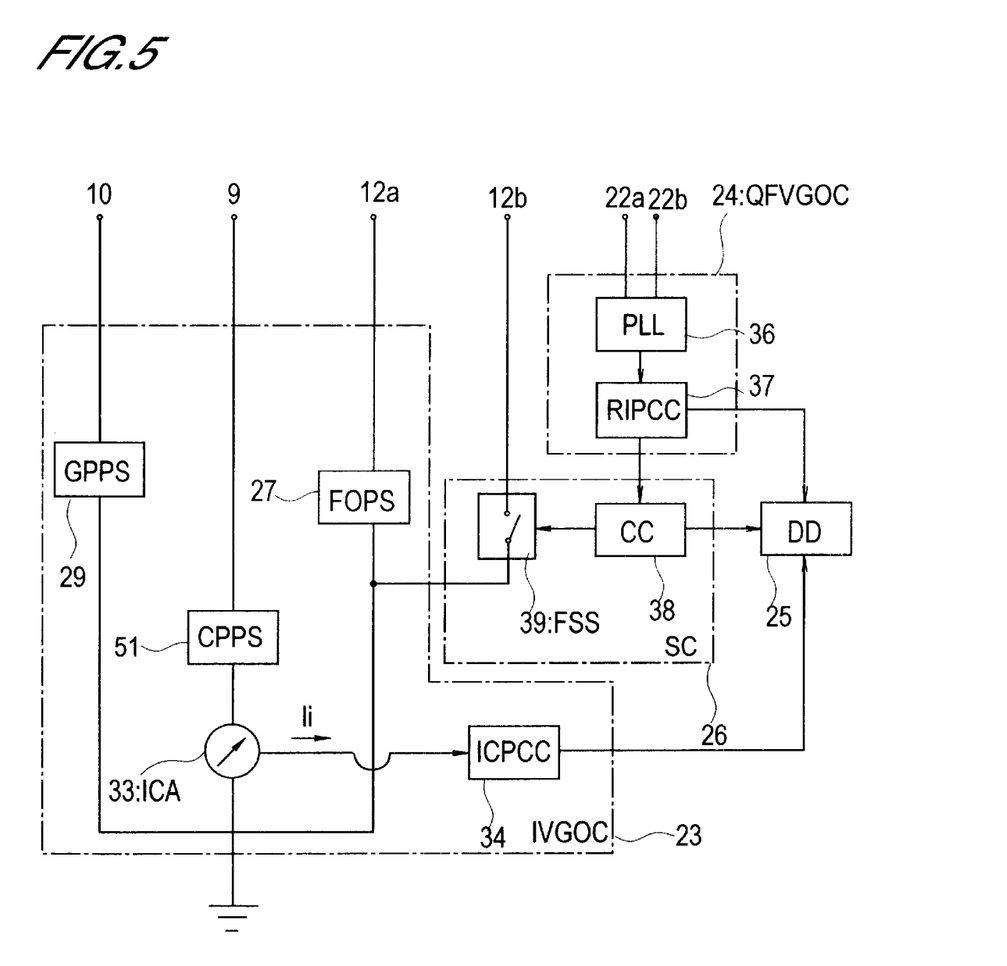

The structure and principle of operation of this vacuum gauge are explained referring to FIG. 4 and FIG. 5. FIG. 4 is a cross-sectional diagram showing the structure of an ionization vacuum gauge of the prior art; FIG. 5 is a block diagram showing the control circuitry of an ionization vacuum gauge of the prior art.

This vacuum gauge installs a B-A ionization vacuum gauge and a quartz friction vacuum gauge on a common flange 2b, connected by an O-ring 5 to the vacuum vessel 1. The B-A ionization vacuum gauge part consists of three electrodes, namely an ion collector 8, filament 3, and grid 4; each is connected to a current introduction terminal mounted on the flange 2b. The installed quartz friction vacuum gauge consists of a quartz oscillator 18, connected to the current introduction terminal mounted on the flange 2b, and a quartz oscillator vessel 19.

Pressure regions of $10^{-1}$ Pa or lower are measured using the B-A ionization vacuum gauge.

In low-pressure regions (high vacuum regions), when a positive grid voltage is applied to the grid 4 while simultaneously heating the filament 3 by passing a current, thermal electrons are emitted from the filament 3 toward the grid 4. Before arriving at the grid 4, these thermal electrons are accumulated within the grid 4 while undergoing oscillating motion in the vicinity of the grid, and collide with residual gas molecules within the vacuum vessel, which are ionized to create positive-charged ions.

When a thermal electron finally arrives at the grid 4, an emission current flows between the filament 3 and grid 4. On applying to the ion collector 8 a voltage (negative voltage) opposite the filament potential, positively-charged ions are captured by the ion collector 8, and consequently an ion current flows into the ion collector 8. At this time, if the voltages applied to each electrode are held constant and the emission current is fixed, then the density of thermal electrons undergoing oscillating motion in the vicinity of the grid 4 is constant. Hence the quantity of ions created is proportional to the concentration of gas molecules within the vacuum vessel 1 and therefore proportional to the pressure, so that by measuring the magnitude of the ion current flowing into the ion collector 8, the pressure within the vacuum vessel 1 can be measured.

On the other hand, pressures in the region from 1 Pa to atmospheric pressure are measured using a quartz friction vacuum gauge.

The oscillator vessel 19 is of a construction which envelops the quartz oscillator 18. Hence charged particles and thermal radiation emitted from the B-A ionization vacuum gauge are blocked, and adhesion of evaporated and sputtered material on the quartz oscillator 18 is prevented. The aperture part 50 exposes the quartz oscillator 18 to the gas pressure within the vacuum vessel 1.

When a constant AC voltage is applied to the quartz oscillator 18 to cause oscillation at a resonance frequency, the resistive component of the AC impedance changes with the gas pressure. Hence by measuring the resistive component of the AC impedance, the pressure within the vacuum vessel 1 can be measured.

Next, the operation of this vacuum gauge is explained, referring to FIG. 5.

The filament 3 of the B-A ionization vacuum gauge is connected to pins 12a and 12b, the ion collector 8 is connected to pin 9, and the grid 4 is connected to pin 10. The lead wires 21 of the quartz oscillator 18 are connected to pins 22a and 22b. A power supply for filament operation (abbreviated to "FOPS") 27 is connected to the pins 12a and 12b via a filament shutoff switch (FSS) 39, to heat the filament 3 and cause emission of thermal electrons. When it is confirmed that the pressure within the vacuum vessel 1, measured by means of the quartz oscillator 18, has reached a prescribed pressure, the filament shutoff switch 39 is turned on, the power supply for filament operation 27 supplies a current to the filament 3, and the B-A ionization vacuum gauge is operated. The collector potential power supply (CPPS) 51 is connected to pin 9, and by holding the collector potential at, for example, −50 V, ions which have been generated are collected. An ion collector ammeter (ICA) 33 is connected between the collector potential power supply 51 and ground, to measure the ion current value. The ion current is converted into a pressure by the ion current-pressure conversion circuit (ICPCC) 34, and the result is displayed on a display device (DD) 25. The grid potential power supply (GPPS) 29 is connected to pin 10, to maintain a positive voltage (for example, +150 V) at the grid 4. As a result, thermal electrons emitted from the filament 3 can be captured.

A phase-locked loop (PLL) circuit 36 is connected between pins 22a and 22b, to cause stable oscillation of the quartz oscillator 18 at a characteristic frequency. A resonance voltage signal corresponding to the resonance impedance is converted into a pressure value by a resonance impedance-pressure conversion circuit (RIPCC) 37, and the result is displayed on the display device 25.

The control circuit (CC) 38 is connected to the resonance impedance-pressure conversion circuit 37; when it is detected that the pressure measured by the quartz oscillator 18 has fallen below a prescribed value (for example, 1 Pa), a control signal is sent to the filament shutoff switch 39 and to the pressure display device 25. As a result of toggling of the filament shutoff switch 39 by this control signal, the B-A ionization vacuum gauge operation is switched, and a wide range of pressures, from atmospheric pressure to high vacuum, is measured.

However, the conventional technology described above has problems such as the following.

As a first problem, by combining a B-A ionization vacuum gauge and a quartz friction vacuum gauge in the same flange, the flange dimensions become large compared with the flange dimensions when each individual measurement element alone is installed in the flange. In addition to the need to secure space for installation in the vacuum vessel, there are considerable constraints on the dimensions of the flange for installation.

As a second problem, if a quartz friction vacuum gauge is installed adjacent to a B-A ionization vacuum gauge, even if the quartz oscillator from the shield case by means of the solid-state thermal conduction of the oscillator lead wires, and consistently thermal effects on the quartz oscillator cannot be avoided. Inparticular, during a degassing operation by passing a current through the grid, the construction is such that the quartz oscillator fully feels the effects of thermal radiation from the grid. The resonance impedance of the quartz oscillator varies with temperature as well as with pressure. Hence when a current is passed through the filament and grid, or even when no current is passed but thermal effects remain due to residual heat, the value of the pressure measured by the quartz friction vacuum gauge contains, to some extent, a measurement error due to temperature fluctuations.

As a third problem, it is not rational, for purposes of avoiding the influence of gas-phase ions and secondary electrons arising from ionization of gas molecules, or of sputtered material, to install another pressure measurement element within the space for gas molecule ionization in a B-A ionization vacuum gauge. Gas-phase ions and secondary electrons, or sputtered material, are incident on the quartz oscillator via the aperture part of the shield, and a shock effect cannot be avoided.

As a fourth problem, by installing the quartz friction vacuum gauge adjacent to both the filament electrode and the grid electrode of the B-A ionization vacuum gauge, a new electric field due to the quartz friction vacuum gauge is created in the vicinity of the grid within the measurement element vessel. Hence the density of thermal electrons accumulated in the grid is reduced, and there is a major effect on the electric field contributing to the advance of thermal electrons which are to ionize the gas molecules. As a result, the measurement sensitivity of the B-A ionization vacuum gauge is degraded.

As a fifth problem, when, on installation of the measurement elements, the vacuum vessel wall behind the filament is distant, gas-phase ions flow to the filament, so that the actual emission current is reduced, and consequently the measurement limit on the high-pressure side of $10^{-1}$ Pa or higher is degraded.

Problems such as these occur not only in the case of B-A ionization vacuum gauges, but in nearly all ionization vacuum gauges comprising as component electrodes a filament, grid, and ion collector. And, the above problems are not limited to a quartz friction vacuum gauge as a separate measurement element, but occur for any measurement element which is easily affected by heat, electrons, and so on from an ionization vacuum gauge.

SUMMARY OF THE INVENTION

Hence one object of this invention is to provide an ionization vacuum gauge which can stably perform measurements over a measurement region extending both from intermediate to high vacuum regions using a first ionization-type measurement part, and also to the measurement region intrinsic to a second measurement part.

Specifically, the above problem with increases in flange dimensions, and also the problems of the effect of thermal radiation from the filament and grid and of the effect of gas-phase ions, are resolved. Further, the problem of the occurrence of nonuniformity in the cylindrical electric field formed between the measurement element vessel and grid is resolved. And, the problem of gas-phase ions flowing into the filament, so that the actual emission current is reduced, is resolved.

In order to attain the above objects, the ionization vacuum gauge of this invention comprises a measurement element vessel, and first and second measurement parts provided within the measurement element vessel. The first measurement part comprises component electrodes including a filament, grid, and ion collector, and is of an ionization-type construction which measures the pressure of a vacuum state. The second measurement part has a construction with functions differing from those of the first measurement part. In this ionization vacuum gauge, the second measurement part is installed near the extension of the axis of the grid, in an area removed from the principle area of flight of thermal electrons emitted from the filament.

Here "grid axis" signifies an axis in the interior of the coil shape of a grid wound into a coil shape, and which is essentially the axis of symmetry of the grid. "Near the extension of the grid axis" means on or near the extension of the grid axis. "Principle area of flight" refers to the area, among the areas through which thermal electrons fly, in which there is a relatively large amount of flight. "Area removed from the principle area of flight of thermal electrons emitted from the filament" refers to an area in which shock effects due to thermal electrons, secondary electrons created or generated accompanying the ionization of gas molecules, and gas-phase ions, can be reduced as much as possible. To "have functions differing from the first measurement part" means that even if the second measurement part is a measurement part which measures pressure, the construction is different from that of the first measurement part, so that the principle of measurement is different, or the range of pressure measurement is different.

By adopting such a configuration, even if both a first and a second measurement part are incorporated in the measurement element vessel, the size of the measurement element vessel is not so large compared with a vacuum gauge having a single measurement part, and moreover there is no need to change the flange size, so that the first problem can be resolved.

Moreover, this configuration acts to minimize the effect on the second measurement part of thermal radiation from the filament and grid, so that the second problem can be resolved.

Further, thermal electrons accelerated between the filament and the grid and which accumulate in the grid vicinity primarily fly in directions perpendicular to the grid axis, so that this configuration acts such that the second measurement part does not receive the shock effects due to these thermal electrons, or due to secondary electrons generated accompanying the ionization of gas molecules, or due to gas-phase ions, so that the third problem can be resolved.

As a result, measurements can be performed stably over both intermediate to high vacuum regions by the first measurement part, employing an ionization-type measurement part, and also over the characteristic measurement region of the second measurement part.

In implementing this invention, preferably the second measurement part should be installed in the space between that wall of the measurement element vessel which is near the extension of the above-mentioned grid axis, and the component electrodes.

In implementing this invention, preferably a shield plate should be provided between the second measurement part and the component electrodes, to spatially separate the second measurement part and the above-mentioned component electrodes.

Here, "spatially separate" means to mostly separate spatially. If spaces are completely separated, the gas the vacuum of which is to be measured cannot enter into the second measurement part, and consequently accurate measurements cannot be performed by the second measurement part. By means of such a configuration, the second and third problems can be further resolved satisfactorily, and there is also the advantage that the effect on the second measurement part of the electric field formed by each of the component electrodes of the ionization-type first measurement part is reduced.

In implementing this invention, preferably the potential of the shield plate should be ground potential.

In this case, there is the further advantage that the effect of the electric field formed by each of the component electrodes of the ionization-type first measurement part on the second measurement part is further reduced.

In implementing this invention, preferably the measurement element vessel should have an approximately axially-symmetric shape, and the above-mentioned grid should be disposed such that the axes of the measurement element vessel and of the grid approximately coincide.

By thus positioning the grid in the approximate center of the measurement element vessel, the distance between the grid and the inner wall of the measurement element vessel can be maintained nearly constant. Hence the density of thermal electrons accumulating within the grid does not decrease, and no large effect is exerted on the electric field contributing to the advance of thermal electrons to cause ionization of gas molecules. As a result, pressure can be measured with stable sensitivity by the first measurement part, and hence the fourth problem can be resolved.

In implementing this invention, preferably the potential of the measurement element vessel should be lower than the filament potential.

By adopting such a configuration, the wall of the measurement element vessel plays the role of an auxiliary electrode which prevents the flow of gas-phase ions into the filament to reduce the actual emission current. Hence the measurement limit is extended to the high-pressure region of 10 Pa. Consequently, the fifth problem can be resolved.

In implementing this invention, preferably the second measurement part should be fixed to an element fastening plate consisting of material with excellent thermal conductivity.

By fixing the second measurement part to an element fastening plate, the effect of vibrations from outside can be reduced.

Further, the element fastening plate consists of material with excellent thermal conductivity, so that even if thermal radiation is incident on the second measurement part, heat can escape from the second measurement part to the element fastening plate via the fixed part of the element fastening plate by means of solid-state thermal conduction.

In implementing this invention, preferably the element fastening plate should be made from a material with excellent thermal conductivity, and be connected to one end of a pipe, the other end of which protrudes outside the measurement element vessel, and the pipe preferably should be held at a low potential approximately equal to that of the measurement element vessel.

Here the pipe need not have an ordinary cylindrical hollow shape; so long as it is connected to the element fastening plate and of such a structure as to protrude out from the measurement element vessel, any shape is possible. Here, the second measurement part is connected to an element fastening plate consisting of material with excellent thermal conductivity and, via the pipe, with the measurement element vessel exterior. Hence even if thermal radiation is incident on the second measurement part, heat can be allowed to escape appropriately from the second measurement part to the measurement element vessel exterior via the fixed part of the element fastening plate, by means of solid-state thermal conduction.

In implementing this invention, preferably the measurement element vessel should have a coupling part that can be coupled removably to the vacuum vessel.

Here "vacuum vessel" means the part of the vacuum gauge other than the measurement element vessel wherein measurement parts to measure vacuum are installed; for example, a vacuum chamber or similar.

By means of such a configuration, the operation of installation of the measurement element vessel in the vacuum vessel can be improved, and at the same time, the measurement element vessel installation space and installation cost can be held to a minimum.

In implementing this invention, preferably, the measurement element vessel should comprise, in part of a wall of the measurement element vessel, a current introduction terminal made from an insulating material for applying specified voltages to the component electrodes of the first measurement part and the second measurement part and for fixing in place the component electrodes; and the current introduction terminal should be provided with pins to introduce current to the first measurement part and the second measurement part.

In implementing this invention, preferably the ionization vacuum gauge should comprise a control circuit to operate the first and second measurement parts.

In implementing this invention, preferably the control circuit should comprise a degassing power supply and degassing switch, in order to remove gas adhering to the measurement element vessel.

Here, to "remove gas adhering to the measurement element vessel" means to remove gas molecules adsorbed by the inner wall surface of the measurement element vessel, component electrodes and other elements, and which may become causes of error during measurements by measurement parts. By comprising a degassing power supply and degassing switch, adsorbed molecules can be removed, and measurement errors can be prevented.

In implementing this invention, the first measurement part may be a Bayard-Alpert type ionization vacuum gauge.

In implementing this invention, the second measurement part may be a measurement part which measures pressure.

In implementing this invention, the measurement part which measures pressure may be a quartz oscillator type pressure gauge.

In implementing this invention, the second measurement part may be a measurement part which measures temperature.

BRIEF DESCRIPTION OF THE DRAWINGS

The forgoing and the other objects, features and advantages of the present invention will be better understood from the following description taken in connection with the accompanying drawings, in which.

DESCRIPTION OF THE PREFERRED EMBODIMENT

Below, an embodiment of this invention is explained using the drawings. In the drawings, the sizes, shapes and positional relationships of components are only shown in summary form sufficient to enable an understanding of this invention; the numerical conditions described below are no more than examples.

Figure 1:
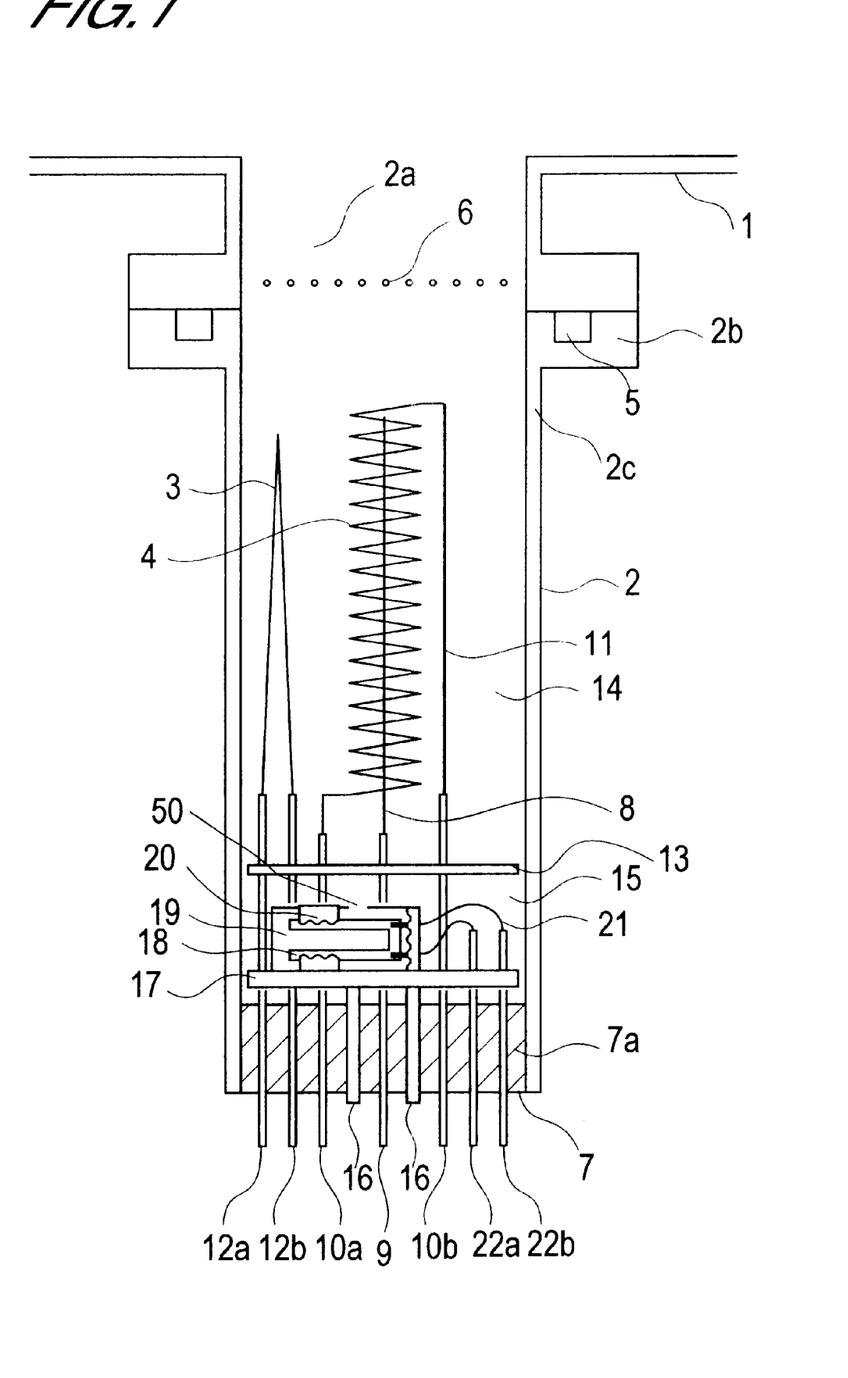
FIG. 1 is a schematic cross-sectional diagram showing an example of the configuration of an ionization vacuum gauge.
Figure 2:
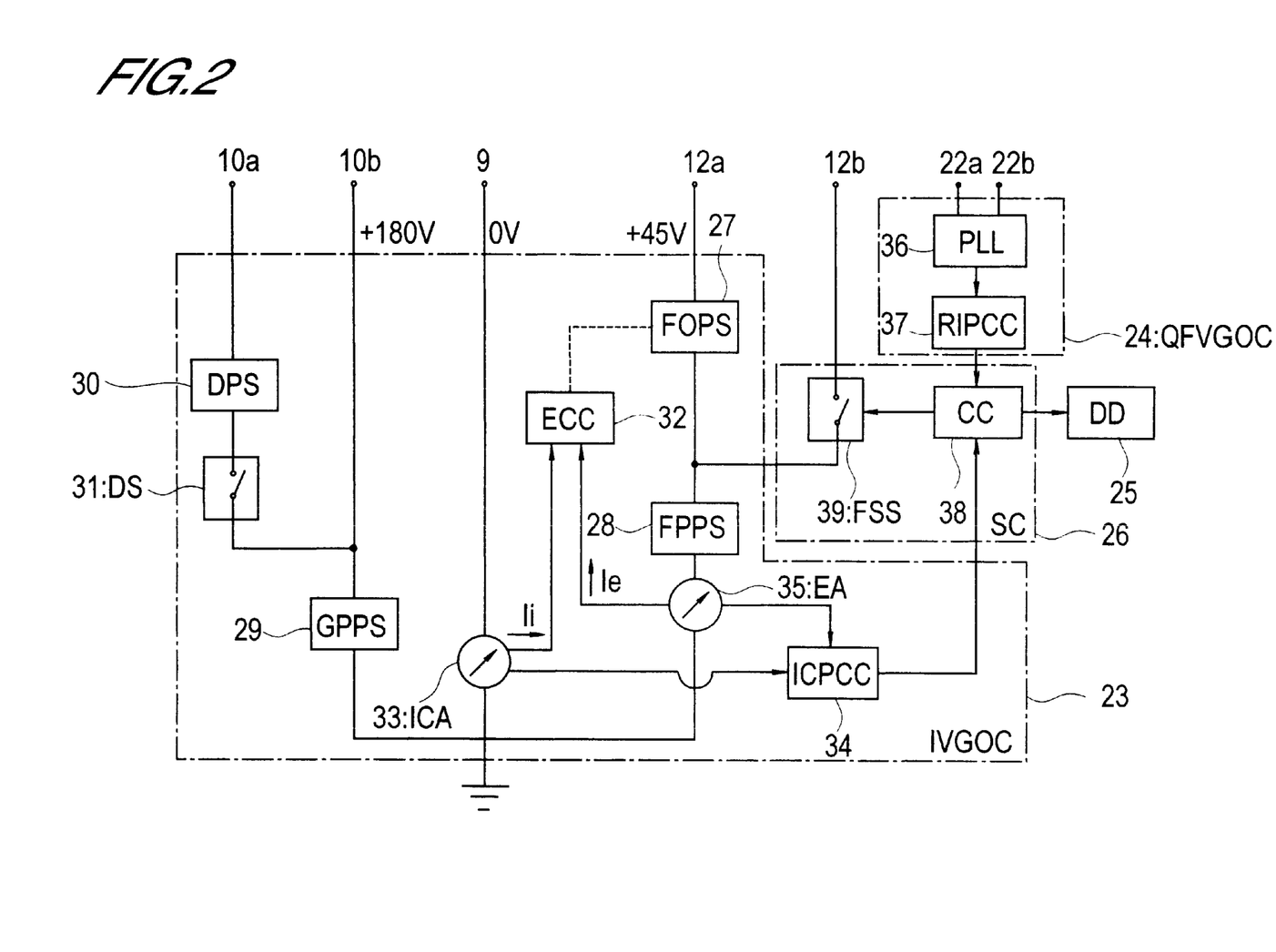
FIG. 2 is a block diagram showing the control circuit of the ionization vacuum gauge of FIG. 1.

FIG. 1 is a cross-sectional diagram showing the configuration of an ionization vacuum gauge of one embodiment of this invention. In particular, part of the vacuum vessel for measurement, and the principal components of the measurement element vessel and vacuum measurement parts installed thereto, are shown. FIG. 2 is a diagram showing the configuration of principal components of the control circuit part of this embodiment.

The ionization vacuum gauge of this embodiment broadly consists of the vacuum vessel for measurement 1 and the measurement element vessel 2. The measurement element vessel 2 further comprises a first and a second measurement part, provided therein. The first measurement part is a measurement part with an ionization-type structure, comprising component electrodes including a filament 3, grid 4 and ion collector 8, and measures the pressure of a vacuum state. The second measurement part has functions different from the first measurement part. In this embodiment, the first measurement part is a measurement part which functions as a B-A type ionization vacuum gauge; the second measurement part is a measurement part which functions as a quartz oscillator type pressure gauge.

The measurement element vessel 2 is, for example, a cylindrical-shape vessel having an inner diameter of approximately 24 mm, and made for example of SUS304 (Japanese standard (JIS)) or other metal. That is, the measurement element vessel 2 has an approximately axially-symmetric shape. Hence the distance between filament 3 and grid 4 can be maintained appropriately. The measurement element vessel 2 is connected to a point at ground potential. That is, the measurement element vessel 2 is held at a potential lower than that of the filament 3, for example ground potential, via a connecting cable or the vacuum vessel 1 on which the measurement element vessel 2 is installed.

On the upper part of the measurement element vessel 2 a gas introduction aperture 2a is opened, and a connecting flange 2b for connection to the vacuum vessel 1 is provided. Vacuum airtightness between the vacuum vessel 1 and flange 2b is maintained by means of an O-ring 5. By means of the measurement element vessel 2 having a coupling flange 2b, coupling with the vacuum vessel 1 is possible with free attachment and removal. Hence the operation of installation of the measurement element vessel 2 in the vacuum vessel 1 can be improved, and at the same time, the installation space and installation cost of the measurement element vessel 2 can be held to a minimum. To maintain vacuum airtightness, a metal gasket may be used in place of the O-ring 5. Further, a structure of an exhaust tube 2c with O-ring 5 may be used for connection to the vacuum vessel 1, without providing a connecting flange 2b for connection.

Near the gas introduction aperture 2a, a shield 6, made for example of SUS304 or other metal mesh, is installed and held at the same potential as the measurement element vessel 2. This shield 6 is a penetration prevention means to prevent the penetration into the measurement element vessel 2 of foreign matter or charged particles from the vacuum vessel 1 and the hindrance of measurements. The gas in the vacuum vessel 1 is introduced via the gas introduction aperture 2a opened in the upper part of the measurement element vessel 2, through the numerous apertures of the shield 6, so that pressure can be measured by the first and second measurement parts.

The measurement element vessel 2 comprises a current introduction terminal 7 in part of the wall of the measurement element vessel 2. This current introduction terminal 7 applies a standard voltage to the component electrodes of the first measurement part and the second measurement part, and also fixes these component electrodes in place. This current introduction terminal 7 is made of an insulating material 7a, in which are installed pins which introduce current into the first measurement part and second measurement part.

Approximately on the center axis of the measurement element vessel 2, an ion collector 8, for example of tungsten approximately 0.2 mm thick, is installed on the pin 9 so as to protrude approximately to the upper end area of the coil of the grid 4. A grid 4, of molybdenum wire 0.2 mm in diameter, of total length approximately 180 mm and with surface coated with, for example, platinum, wound into a coil shape and surrounding the ion collector 8, is supported by a grid support 11 fixed in place by pins 10a and 10b. The grid 4 should preferably have approximately axial symmetry. By means of the grid 4, a uniform electric field is formed. In the case of a B-A ionization vacuum gauge as in this embodiment, the axis of the grid 4 is the ion collector 8, and hence the grid 4 is disposed such that the axes of the measurement element vessel 2 and grid 4 essentially coincide. On the outside of the grid 4, a filament 3 of tri-coated iridium wire approximately 0.2 mm in diameter, formed into a hairpin shape approximately 12 mm in height, is mounted so as to be supported by the pins 12a, 12b at a position a distance of, for example, 2.5 mm from the grid 4. By means of the above structure, the component electrodes of the first measurement part, which is the measurement part of the B-A type ionization vacuum gauge, are formed.

Further, in this invention the second measurement part is installed near the extension of the grid axis. As explained below, thermal electrons are emitted principally in directions perpendicular to the extended direction of the filament; and, in this embodiment, the grid axis and the filament extended direction are parallel. Hence the second measurement part is installed in a space removed from the principal space through which thermal electrons emitted from the filament fly. Further, the second measurement part is installed in the space between the component electrodes and that part of the wall of the measurement element vessel 2 near the extension of the grid axis, which in this embodiment is the current introduction terminal.

Between the ion collector 8, grid 4 and filament 3 which are the component electrodes of the first measurement part, and the second measurement part is installed a shield plate 13 made of for example SUS304 or other metal, to spatially separate the second measurement part from the component electrodes. Hence a second measurement part installation space 15, of height approximately 8 mm and isolated from the gas molecule ionization space 14 of the first measurement part, is formed. This shield plate 13 is fixed to the inner surface of the measurement element vessel 2, and as explained above the measurement element vessel 2 is held at ground potential, so that the shield plate 13 is also at ground potential. The pins connected to each of the ion collector 8, grid 4 and filament 3 pass through apertures in the shield plate 13 at each of the pin positions, such that they do not touch the shield plate 13.

The second measurement part has a construction which comprises a quartz oscillator vessel 19 and quartz oscillator 18. The quartz oscillator vessel 19 is of a construction which encloses the quartz oscillator 18, so that the incidence of charged particles and thermal radiation emitted from the B-A ionization vacuum gauge can be prevented, and adhesion of evaporated and sputtered material to the quartz oscillator 18 can be prevented. The quartz oscillator vessel 19 has an aperture part 50; by means of this aperture part 50, the quartz oscillator 18 is exposed to the gas pressure within the vacuum vessel 1. The quartz oscillator 18 is fixed to the quartz oscillator vessel 19 via an element fastening fixture 20. The quartz oscillator 18 is connected to pins 22a, 22b installed in the current introduction terminal 7 via lead wires 21. Of the second measurement part, the quartz oscillator vessel 19 is fixed to an element fastening plate 17 composed of a material with excellent thermal conductivity, for example a metal such as kovar. The element fastening plate 17 is supported by a pipe, for example the cylindrical pipe 16, composed of material with excellent thermal conductivity, for example a metal such as kovar. "Kovar" is made of a Fe—Ni—Co alloy and has an extremely low thermal expansion coefficient as compared with other metals, which is well known to a person skilled in the art. This cylindrical pipe 16 is incorporated into the center of the current introduction terminal 7, and one end of the cylindrical pipe 16 protrudes outside the measurement element vessel 2. This cylindrical pipe 16 and element fastening plate 17 can be held at ground potential by, for example, connecting the cylindrical pipe 16 and element fastening plate 17 to the measurement element vessel 2.

By means of the foregoing construction of the first and second measurement part and of the peripheral parts, the advantages explained below are realized.

Because the second measurement part is installed near the extension of the grid axis, and because a shield plate 13 is installed, the effect on the quartz oscillator 18 of thermal radiation and of secondary electrons accompanying ionization of gas molecules during the passage of current through the filament 3 and grid 4 of the first measurement part, which is the measurement part of a B-A ionization vacuum gauge, as well as the effect of gas-phase ions and sputtered material, can be held to a minimum. Further, the shield plate 13 is at ground potential, so that the effect of the electric field from the component electrodes in the first measurement part on the second measurement part can be reduced.

Because the quartz oscillator 18 is fixed to the cylindrical pipe 16 with excellent thermal conductivity and to the element fastening plate 17, there is no longer any vibration of the quartz oscillator 18 itself due to external vibrations, causing changes in the electrostatic capacitance formed in the vicinity of the quartz oscillator 18, thereby causing fluctuations in the measured pressure as a result. Further, the heat flowing into the quartz oscillator vessel 19 is released into the atmosphere via the cylindrical pipe 16. As a result, when the filament 3 is turned on, or even immediately after the filament is turned off, temperature increases in the quartz oscillator 18 mounted on the element fastening plate 17 are suppressed. This cylindrical pipe 16 is installed on the current introduction terminal 7 so as to surround the pin 9 connected to the ion collector 8. Hence by maintaining the cylindrical pipe 16 at the same potential as the measurement element vessel 2, electrical noise penetrating into the ion collector 8 is released by the cylindrical pipe 16, and as a result the cylindrical pipe 16 plays the role of preventing electrical noise from penetrating into the ion collector 8.

As a result, the second measurement part can perform pressure measurements with small measurement error and with stable sensitivity.

Because the grid axis and the measurement element vessel axis essentially coincide, a uniform electric field can be formed by the grid, and consequently the first measurement part can perform pressure measurements with small measurement error and with stable sensitivity.

Next, the control circuit which operates the first and second measurement parts of the ionization vacuum gauge of this embodiment is explained, referring to FIG. 2. This control circuit comprises an ionization vacuum gauge operation circuit (abbreviated to "IVGOC") 23 to operate the first measurement part, which is the measurement part of the B-A type ionization vacuum gauge; a quartz friction vacuum gauge operation circuit(QFVGOC) 24 to operate the second measurement part, which is the measurement part of the quartz friction vacuum gauge; a display device (DD) 25 to display pressure measurement values for each vacuum gauge; and a switching circuit (SC) 26 to switch the pressure display of each vacuum gauge according to the pressure region, and to turn on and off the filament 3 of the first measurement part.

The ionization vacuum gauge operation circuit 23 comprises a filament operation power supply (FOPS) 27 to cause emission of thermal electrons from the filament 3; a filament potential power supply (FPPS) 28 to apply to the filament 3 a potential higher than the potential of the ion collector 8; a grid potential power supply (GPPS) 29 to apply a grid potential to the grid 4 in order that thermal electrons emitted from the filament 3 are accumulated; a degassing power supply (DPS) 30 and degassing switch (DS) 31 to enable electrical conduction through and heating of the grid 4; an emission control circuit (ECC) 32 to control the electrons flowing into the grid 4 at a fixed amount; an ion collector ammeter (ICA) 33, connected between the ion collector 8 and ground, to measure the ion current; an ion current-pressure conversion circuit (ICPCC) 34 to convert the ion current Ii into a pressure; and, an emission ammeter (EA) 35, connected between the filament potential power supply 28 and ground, to measure the emission current Ie.

The quartz friction vacuum gauge operation circuit 24 comprises a phase-locked loop (PLL) circuit 36 which causes stable oscillation of the quartz oscillator 18 at its own characteristic resonance frequency, and a resonance impedance-pressure conversion circuit (RIPCC) 37 to convert the resonance impedance into a pressure.

The switching circuit 26 comprises a control circuit (CC) 38 to output a filament on/off signal for the B-A type ionization vacuum gauge, based on pressure signals from the resonance impedance-pressure conversion circuit 37 and the ion current-pressure conversion circuit 34, and a filament shutoff switch (FSS) 39 to turn on and off the filament of the B-A type ionization vacuum gauge, based on on/off signals from the control circuit 38.

The degassing power supply 30 and grid potential power supply 29 are connected to the pins 10a and 10b respectively connected to the grid 4; the ion collector ammeter 33 is connected to the pin 9 connected to the ion collector; the filament operation power supply 27 and filament shutoff switch 39 are connected to the pins 12a and 12b connected to the filament 3; and the PLL circuit 36 is connected to the pins 22a and 22b connected to the quartz oscillator 18.

Next, the construction and functions of the first and second measurement parts are explained in detail.

The first measurement part is the measurement part of a B-A type ionization vacuum gauge, for measurement of pressures in low-pressure regions (high vacuum regions).

A positive grid voltage (hereafter, Vg) of, for example 180 V, is applied to the grid 4 by the grid potential power supply 29, and at the same time a filament voltage (hereafter Vf) of, for example, 45 V is applied to the filament 3 by the filament potential power supply 28. When the filament 3 is also heated by passing a current from the filament operation power supply 27, thermal electrons are emitted from the filament 3 toward the grid 4. These thermal electrons are emitted primarily in the gas molecule ionization space 14, that is, in the principal space for flying of thermal electrons. Before these thermal electrons arrive at the grid 4, they undergo oscillating motion in the vicinity of the grid 4 while accumulating in the grid 4. At this time, a number of the emitted thermal electrons collide with gas molecules within the measurement element vessel 2, and as a result, ionization of gas molecules produces positively-charged ions.

When thermal electrons finally reach the grid 4, an emission current Ie flows between the filament 3 and grid 4. Here if a negative ion collector voltage (hereafter Vtc) opposite the filament potential is applied to the ion collector 8, positively-charged ions are captured by the ion collector 8, and consequently an ion current Ii flows in the ion collector 8. In this embodiment, the ion collector 8 is held at a potential of 0 V by grounding via the pin 9. If the voltages applied to each of the electrodes are held constant, and at the same time the emission current Ie is held constant, then the density of thermal electrons undergoing oscillating motion in the vicinity of the grid 4 is constant. Here the quantity of ions generated is proportional to the density of gas molecules within the vacuum vessel 1, that is, to the pressure. Hence by measuring the magnitude of the ion current Ii flowing into the ion collector 8 by means of the ion collector ammeter 33, and by converting the measurement result (the current value) into a pressure by means of the ion current-pressure conversion circuit 34, the pressure within the vacuum vessel 1 can be measured. 5 In order that thermal electrons emitted from the filament 3 arrive at the grid, it is necessary that Vg>Vf. Further, in order to impart energy to newly created positive-charged ions to advance to the ion collector 8, it is necessary that Vg>Vtc. And, in order that thermal electrons do not flow into the ion collector 8, it is necessary that Vf>Vtc. Hence the relation Vg>Vf>Vtc must be satisfied. In this embodiment, it was assumed that Vg=180 V, Vf=45 V, and Vtc=0 V; but so long as the voltages satisfy the above relation, these figures may be chosen appropriately.

In order to hold the emission current Ie constant as in the above explanation, feedback is applied to the filament operation power supply 27 via the emission control circuit 32, based on the ion current Ii measured by the ion collector ammeter 33 and the emission current Ie measured by the emission ammeter 35. This feedback is explained below.

In addition to thermal electrons arriving at the grid 4 without colliding with gas molecules, thermal electrons which have collided with gas molecules, and secondary electrons generated when positive-charged ions are produced by ionization of gas molecules, also contribute to the emission current Ie. Hence even if the voltage Vf due to the filament potential power supply and the conduction power due to the filament operation power supply 27 are constant, the emission current Ie changes according to the number of gas molecules, that is, according to the pressure. In order that the emission current Ie is held constant, feedback must be applied by the emission control circuit 32. This feedback is performed by controlling the conduction power from the filament operation power supply 27 such that the emission current Ie remains constant, while detecting the emission current Ie in the emission ammeter 35.

This feedback is performed by having the emission control circuit 32 detect the emission current Ie in the emission ammeter 35, while simultaneously detecting the ion current Ii in the ion collector ammeter 33. That is, the constant value of the above emission current Ie is used selectively according to the pressure region for measurement, that is, according to the ion current value Ii, and so the constant value must first be determined. The constant value of the emission current Ie is used selectively according to the pressure region for measurement, that is, according to the ion current Ii, for the following reason. In high-pressure regions, the filament surface temperature is lowered, that is, the conduction power from the filament operation power supply 27 is reduced, in order to prevent filament oxidation and corrosion. Consequently, the constant value for the emission current Ie is set at a low value. On the other hand, in low-pressure regions the gas molecule density is low, and the ion current Ii is also low, so that the emission current Ie must be increased in order that the ion current Ii does not fall below the ion current detection capacity. Consequently, although there is the above-described need to prevent oxidation and corrosion of the filament, the emission current Ie is set higher. In order to detect the pressure at which the constant value for the emission current Ie is switched, the emission control circuit 32 detects the ion current value Ii in the ion collector ammeter 33 and performs feedback.

As a result of operation of the B-A type ionization vacuum gauge measurement part and control circuit according to the functions and principles described above, the measured pressure is calculated in the ion current-pressure conversion circuit 34, based on the ion current Ii measured by the ion collector ammeter 33 and the emission current Ie measured by the emission ammeter 35. That is, if the measured pressure is P, then the pressure is calculated from the formula $P=(1/S)\cdot(Ii/Ie)$. Here S is the sensitivity of the measurement element.

Degassing of the grid 4 is performed by means of the degassing power supply 30 and degassing switch 31; this is explained below. Upon performing measurements of the vacuum using the B-A ionization vacuum gauge, gas molecules are adsorbed onto the grid 4 and other component electrodes and onto the measurement element vessel 2 and other peripheral parts; these adsorbed gas molecules may become noise in the measurement of pressure. Hence by turning on the degassing switch 31 and causing conductive heating of the grid 4 by means of the degassing power supply 30, adsorbed gas molecules are desorbed and removed from the grid 4 and peripheral parts. This degassing by means of a current passed through the grid may be performed as appropriate, for example, prior to performing vacuum measurements.

The second measurement part is the measurement part of a quartz friction vacuum gauge, for measuring pressures in high-pressure regions (low vacuum regions).

A fixed AC voltage is applied by the PLL circuit 36 of the quartz friction vacuum gauge operation circuit 24 to the quartz oscillator 18, which is caused to oscillate at its characteristic resonance frequency. At this time, when gas molecules collide with the quartz oscillator 18 in stable oscillation at the characteristic resonance frequency, a viscous resistance force occurs at the surface of the quartz oscillator 18. This viscous resistance force is proportional to the gas pressure, and can be regarded as a change in the resonance impedance of the quartz oscillator 18. At this time, the resonance impedance value detected by the PLL circuit 36 is converted into a pressure by the resonance impedance-pressure conversion circuit 37, to measure the pressure within the measurement element vessel 2.

Next, the method for switching measurements in response to changes in pressure regions during pressure measurements by the B-A ionization vacuum gauge and quartz friction vacuum gauge is explained.

From atmospheric pressure to high-pressure regions (low vacuum regions), the pressure value measured by the quartz friction vacuum gauge is displayed via the control circuit 38 within the switching circuit 26; in low-pressure regions (intermediate or high vacuum regions), the pressure value measured by the B-A ionization vacuum gauge is displayed via the control circuit 38.

Here, regardless of whether the filament shutoff switch 39 is in the on or the off state, pressure measurements are always performed by the quartz friction vacuum gauge. On the other hand, the B-A ionization vacuum gauge only has current flowing between pins 12a and 12b by means of the filament operation power supply 27 when the filament shutoff switch 39 is turned on, and so pressure measurements are performed only when the filament shutoff switch 39 is turned on. A grid potential voltage is always applied to the grid 4 by the grid potential power supply 29, and a filament potential voltage is always applied to the filament 3 by the filament potential power supply 28.

First, a pressure signal obtained from the resonance impedance-pressure conversion circuit 37, that is, a measurement value from the quartz friction vacuum gauge, is sent to the control circuit 38 within the switching circuit 26. At this time, when the filament 3 of the B-A ionization vacuum gage is in the off state, that is, when the filament shutoff switch 39 is turned off, the pressure value measured by the quartz friction vacuum gauge is displayed on the display device 25. On the other hand, when the filament 3 of the B-A ionization vacuum gauge is in the on state, that is, when the filament shutoff switch 39 is turned on, the pressure value measured by the B-A ionization vacuum gauge is displayed on the display device 25.

Here, the filament turn-on signal of the B-A ionization vacuum gauge is set so as to be output when the pressure signal obtained from the resonance impedance-pressure conversion circuit 37 is equal to or less than, for example, 4 Pa, and the filament turn-off signal is set to be output when the pressure signal obtained from the ion current-pressure conversion circuit 34 in the ionization vacuum gauge operation circuit 23 is equal to or greater than, for example, 8 Pa.

That is, when measurements in high-pressure regions are performed by the quartz friction vacuum gauge (at which time the filament turn-off signal is output), if the pressure within the vacuum vessel 1 decreases, and the pressure value obtained by the resonance impedance-pressure conversion circuit 37 is detected by the control circuit 38 to be equal to or less than 4 Pa, then the filament turn-on signal for the B-A ionization vacuum gauge is output from the control circuit 38. Next, the filament shutoff switch 39 receives this signal and supplies power to the filament 3. Simultaneously, the pressure display on the display device 25 is switched to the pressure value measured by the B-A ionization vacuum gauge. Conversely, when measurements in low-pressure regions are performed by the B-A ionization vacuum gauge (at which time the filament turn-on signal is output), if the pressure within the vacuum vessel 1 increases, and the control circuit 38 detects that the pressure value obtained from the ion current-pressure conversion circuit 34 is equal to or greater than 8 Pa, then the filament turn-off signal for the B-A ionization vacuum gauge is output from the control circuit 38. Next, the filament shutoff switch 39 receives this signal and shuts off power supply to the filament 3. Simultaneously, the pressure display on the display device 25 is switched to the pressure value measured by the quartz friction vacuum gauge.

The pressure region for switching of the ionization vacuum gauge of this invention can be 4 Pa to 8 Pa as in the above, or can be set to 10 Pa or so. In the prior art, on the other hand, this region was at most from $10^{-1}$ Pa to 1 Pa. In the prior art, this low pressure switching region can be said to indicate the poor measurement precision in the high-pressure range, or the low measurement limit, for the reason explained below. Because the ions have positive charges, ions which should ordinarily be captured by the ion collector 8 flow into the filament 3 (which, with respect to the ion, corresponds to a negative charge). Hence this is apparently the same as the emission of thermal electrons from the filament. As a result, the thermal electrons contributing to ionization of gas molecules are reduced in number and accordingly emission current, in other words, actual (or effective) emission current is reduced, so that the measured pressure is no longer reliable. This phenomenon is particularly marked in high-pressure regions. On the other hand, in low-pressure regions the emission current is high and there are few gas molecules, so that there is almost no decrease in the actual emission current. Hence the measurement limit is degraded in high-pressure regions in which the effect of a reduced actual emission current is large, and consequently the switching pressure region is lowered.

In this embodiment, the measurement element vessel 2 is set at a potential lower than that of the filament, so that the inner wall of the measurement element vessel 2 plays the role of an auxiliary electrode to prevent the flow of ions into the filament 3 to reduce the actual emission current. Hence the measurement limit in high pressure regions, in which the effect of reductions in the actual emission current is increased, can be improved. As a result, the switching pressure region is raised compared with the case of the prior art. Simultaneously, the pressure range over which the quartz friction vacuum gauge, which is easily affected by pressure measurement error due to temperature, thermal electrons and other causes, is reduced, so that highly reliable measurements can be performed.

Figure 3:
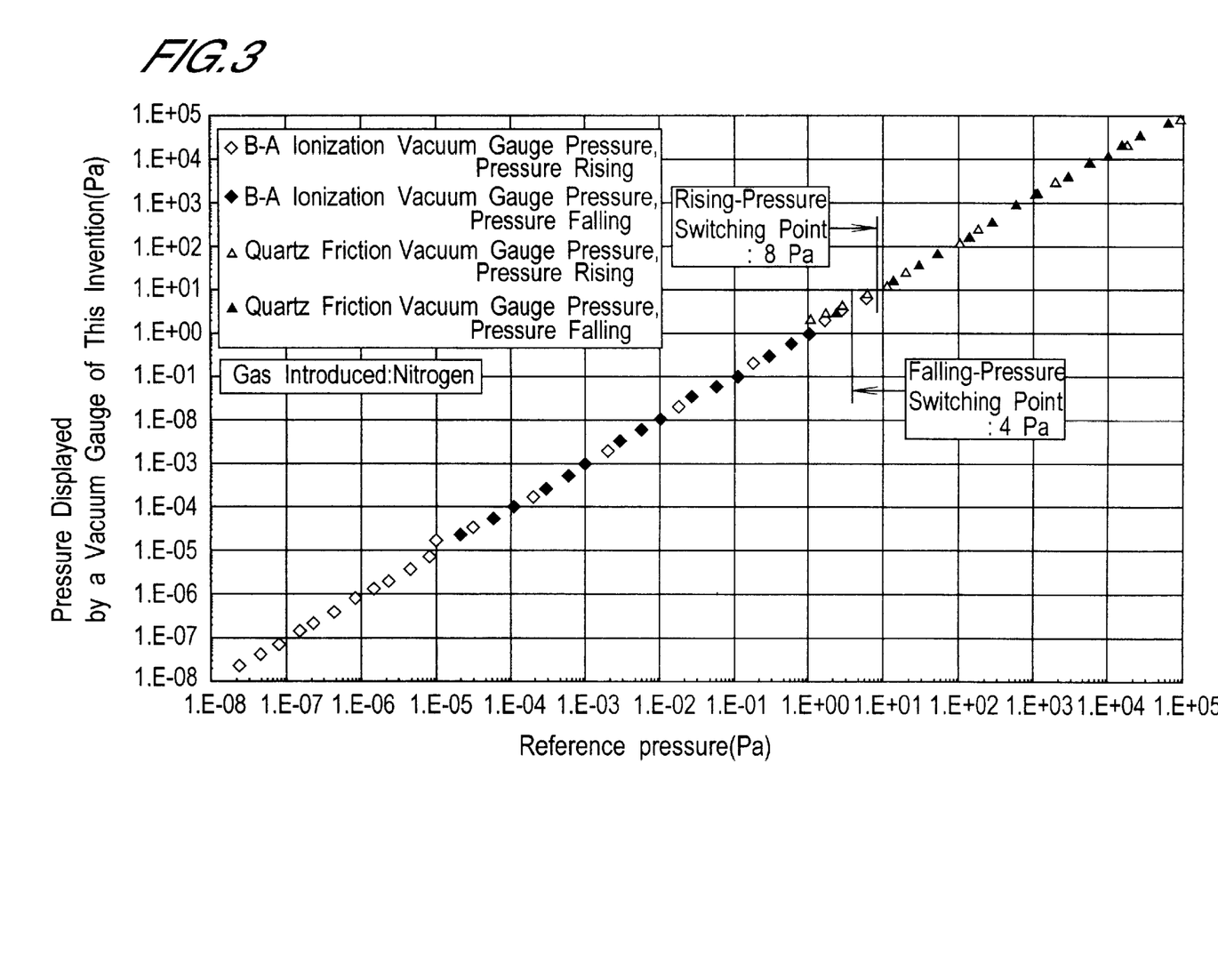
FIG. 3 is a graph of measurements of pressure over a broad region from atmospheric pressure to ultra-high vacuum.

Next, experimental results on pressure measurements performed using an ionization vacuum gauge of this embodiment of the invention are explained. FIG. 3 is a graph of pressure values measured over a broad range, from atmospheric pressure to high vacuum, using an ionization vacuum gauge of this embodiment.

In FIG. 3, the horizontal axis shows the reference pressure (Pa), and the vertical axis shows the pressure (Pa) measured by a vacuum gauge of this embodiment. The white diamonds in FIG. 3 denote data measured using the B-A ionization vacuum gauge during rising pressure; the black diamonds denote data measured using the B-A ionization vacuum gauge during falling pressure. The white triangles denote data measured by the quartz friction vacuum gauge during rising pressure; the black triangles denote data measured by the quartz friction vacuum gauge during falling pressure. Nitrogen was introduced as the gas used in pressure measurements. From this measurement data, it is seen that the pressure values measured by the vacuum gauge of this embodiment and the reference pressure are linearly related. Hence it is seen that measurements can be performed from atmospheric pressure to a high vacuum of $1 \times 10^{-7}$ Pa. In particular, switching is performed with continuity at 4 Pa, the point for switching from the quartz friction vacuum gauge to the B-A ionization vacuum gauge (that is, the switching point during falling pressure), and at 8 Pa, the point for switching from the B-A ionization vacuum gauge to the quartz friction vacuum gauge (that is, the switching point during rising pressure). Normally when switching from a B-A ionization vacuum gauge to a quartz friction vacuum gauge, thermal radiation and other effects on the filament are cause for concern; but no temperature or other effects are observed in the measurement data at this switching point.

The configurations, shapes, materials, numerical values, and other details of the embodiment described above are no more than one example, and this invention is not limited thereby; other configurations, shapes, materials, numerical values, and so on can be substituted as appropriate.

For example, in this embodiment, as the first measurement part, a B-A ionization vacuum gauge was employed; but so long as the ionization vacuum gauge has a configuration comprising component electrodes including a filament, grid and ion collector, the ionization vacuum gauge can be used in this invention. For example, a triode-type ionization vacuum gauge, hot cathode ionization vacuum gauge, or cold cathode ionization vacuum gauge, with constructions in which a filament is present on the central axis, and a grid and ion collector are formed surrounding the filament, may also be used. An extractor-type ionization vacuum gauge, suppressor vacuum gauge, Schultz gauge or similar device can also be used.

In this embodiment of the invention, the second measurement part was a quartz friction vacuum gauge; but any pressure-measuring element which can be installed in a vacuum can be used as the second measuring part of this invention. As this pressure-measuring element, pressure measurement elements which utilize semiconductors or electronic component manufacturing technology, such as for example diffusion-type pressure transducers, static capacitance-type silicon diaphragm pressure elements, and gas-sensing elements utilizing temperature detection elements or gas-sensing semiconductors, can also be employed.

In this embodiment of the invention, the quantity for measurement of the second measurement part was pressure; but this invention is not so limited. In this invention, it is possible to install a second measurement part so as not to be It affected by heat, electrons or other disturbances, while retaining the functions and capacity for measurement of pressure by an ionization vacuum gauge. Hence as the second measurement part, in addition to a pressure measurement element, a temperature measurement element which measures temperature can also be used to great advantage. Advantages can also be obtained for any measurement element which is easily affected by heat, electrons or other disturbances, regardless of the quantity measured.

In this embodiment, a first and second measurement part are installed in a measurement element vessel, in a construction enabling attachment and removal of the measurement element vessel by means of a connecting flange. However, a construction may be employed in which, for example, only the connecting flange and the current introduction terminal can be attached and removed, while the measurement element vessel is part of the vacuum vessel.

Further, in this embodiment a construction was adopted in which the pressure measurement value of the B-A ionization vacuum gauge is detected and a filament turn-off signal for the B-A ionization vacuum gauge is output; however, the pressure measurement value of a quartz friction vacuum gauge which is constantly operating may also be detected.

As explained above in detail, according to this invention an ionization vacuum gauge comprises a measurement element vessel and, a first and second measurement parts provided respectively within this measurement element vessel; the first measurement part comprises component electrodes including a filament, grid, and ion collector, and has an ionization-type construction attaining measurement of the pressure of a vacuum state; the second measurement part has a construction with functions differing from those of the first measurement part. In this ionization vacuum gauge, the second measurement part is disposed near the extension of the grid axis, in a space removed from the principal space in which thermal electrons emitted from the filament fly. Consequently the sizes of the measurement element vessel and flange are reduced, the operation of installation of the measurement element vessel in the vacuum vessel can be improved, and the measurement element vessel installation space and installation cost can be held to a minimum. Further, measurements of the pressure by the first measurement part in intermediate vacuum to high vacuum regions, and measurements by the second measurement part in a characteristic measurement region, can both be performed stably, without being affected by thermal radiation from the filament of the first measurement part, secondary electrons, gas-phase ions, sputtered material or other disturbances, or by the electric field of the component electrodes of the first measurement part.

A shield plate is provided between the second measurement part and the component electrodes to spatially separate the second measurement part and the component electrodes, so that no effects are felt from thermal radiation from the filament of the first measurement part, secondary electrons, gas-phase ions, sputtered material, or other disturbances, or from the electric field of the component electrodes of the first measurement part.

The measurement element vessel has an approximately axially-symmetric shape, and the grid is disposed such that the axes of the measurement element vessel and the grid essentially coincide; hence the distance between the grid and the inner wall of the measurement element vessel can be held constant, and a uniform cylindrical electric field can be formed. Consequently stable sensitivity can be obtained in the first measurement part, without being affected by the mounted shape of the vacuum vessel.

The second measurement part is fixed to an element fastening plate consisting of material with excellent thermal conductivity, so that thermal radiation entering the second measurement part can be easily released to the outside.

The measurement element vessel is at a potential lower than that of the filament, so that the measurement element vessel plays the role of an auxiliary electrode preventing the flow of ions into the filament to reduce the actual emission current, thereby improving the measurement limit at high pressures of the first measurement part.

What is claimed is:

1. An ionization vacuum gauge, comprising:
   a measurement element vessel;
   a first measurement part provided within said measurement element vessel, said first measurement part comprises component electrodes including a filament, a grid and an ion collector, and is of an ionization construction to measure the pressure of a vacuum state;
   a second measurement part provided within solid measurement element vessel, said second measurement part having a construction with functions differing from those of said first measurement part
   and is disposed in a space which is near the extension of an axis of said grid, and away from the principal area of flight of thermal electrons emitted from said filament; and
   a shield plate arranged between said second measurement part and said component electrodes for spatially separating said second measurement part and said component electrodes.

2. The ionization vacuum gauge according to claim 1, wherein said second measurement part is disposed in a space between said component electrodes and a wall of said measurement element vessel that is near the extension of the axis of said grid.

3. The ionization vacuum gauge according to claim 1, wherein a potential of said shield plate is ground potential.

4. The ionization vacuum gauge according to claim 1, wherein said measurement element vessel is of an approximately axially-symmetric shape, and said grid is disposed such that the axes of the measurement element vessel and of said grid essentially coincide.

5. The ionization vacuum gauge according to claim 1, wherein a potential of said measurement element vessel is a potential lower than a potential of said filament.

6. The ionization vacuum gauge according to claim 1, wherein said second measurement part is fixed to an element fastening plate made from a material with high thermal conductivity.

7. The ionization vacuum gauge according to claim 6, wherein said element fastening plate is connected to one end of a pipe, the other end of said pipe protrudes outside the measurement element vessel, and the pipe being held at a low potential approximately equal to that of said measurement element vessel.

8. The ionization vacuum gauge according to claim 1, wherein said measurement element vessel has a coupling part which can be coupled removably to a vacuum vessel.

9. The ionization vacuum gauge according to claim 1, wherein said measurement element vessel comprises, in part of a wall of said measurement element vessel, a current introduction terminal made from an insulating material for applying specified voltages to the component electrodes of said first measurement part and said second measurement part and for fixing in place said component electrodes; and said current introduction terminal is provided with pins to introduce current to said first measurement part and said second measurement part.

10. The ionization vacuum gauge according to claim 1, wherein said ionization vacuum gauge comprises a control circuit to operate said first and second measurement parts.

11. The ionization vacuum gauge according to claim 10, wherein said control circuit comprises a degassing power supply and degassing switch in order to remove gas adhering to said measurement element vessel.

12. The ionization vacuum gauge according to claim 1, wherein said first measurement part is a Bayard-Alpert type ionization pressure gauge.

13. The ionization vacuum gauge according to claim 1, wherein said second measurement part is a measurement part to measure pressure.

14. The ionization vacuum gauge according to claim 13, wherein said measurement part to measure pressure is a quartz oscillator-type pressure gauge.

15. The ionization vacuum gauge according to claim 1, wherein said second measurement part is a measurement part to measure temperature.

* * * * *